July 2, 1968  H. F. WIEGANDT  3,390,963
COUNTERCURRENT MASS TRANSFER BETWEEN TWO PHASES
AT LEAST ONE OF WHICH IS A FLUID
Filed Aug. 7, 1963  2 Sheets-Sheet 1

INVENTOR
HERBERT F. WIEGANDT

BY Toulmin & Toulmin
ATTORNEYS

July 2, 1968   H. F. WIEGANDT   3,390,963
COUNTERCURRENT MASS TRANSFER BETWEEN TWO PHASES
AT LEAST ONE OF WHICH IS A FLUID
Filed Aug. 7, 1963                                    2 Sheets-Sheet 2

INVENTOR
HERBERT F. WIEGANDT

BY *Toulmin & Toulmin*

ATTORNEYS

3,390,963
COUNTERCURRENT MASS TRANSFER BETWEEN TWO PHASES AT LEAST ONE OF WHICH IS A FLUID
Herbert F. Wiegandt, Rueil-Malmaison, Hauts-de-Seine, France, assignor to Institut Francais de Petrole des Carburants et Lubrifiants, Rueil-Malmaison, Hauts-de-Seine, France
Filed Aug. 7, 1963, Ser. No. 300,614
7 Claims. (Cl. 23—270.5)

This invention relates to fundamental chemical engineering, in particular to countercurrent contact, even more particularly to countercurrent mass transfer.

In the separation and purification of chemicals, the chemical engineer utilizes mass transfer systems wherein desired and undesired materials are transferred from one phase to another, classical examples of such processes being distillation, solvent extraction, absorption, adsorption, crystallization, emulsification and demulsification.

An object of this invention, therefore, is to provide an improved process and apparatus for mass transfer systems.

Upon further study of the specification and claims, other objects and advantages of the present invention will become apparent.

To attain the objects of this invention, there is provided a new system for countercurrent contact between two phases of which at least one is a fluid (liquid or gaseous), characterized essentially by the fact that the contact between the two phases is effected inside a chamber of helicoidal form of which the longitudinal axis is inclined to the horizontal, the displacement being effected by rotation of the chamber about its axis.

This system of countercurrent contact is applicable to the following combinations of phases:

(1) Gaseous-liquid
(2) Liquid-liquid
(3) Liquid-solid
(4) Solid-gaseous

By way of nonlimitative examples the countercurrent contact may be carried out in such operations as:

Absorption of $H_2S$ and $CO_2$ contained in a natural gas by an aqueous solution of ethanolamine,
Removal of gaseous ammonia contained in air, by water,
Extraction of uranyl nitrate from a water solution thereof by means of tributylphosphate,
Furfural extraction of lube oil,
Extraction of copper from oxidized copper ores with dilute sulfuric acid,
Extraction of sugar from sugar beets by suitable solvents,
Removal of water contained in a gas by adsorption thereof over molecular sieves or silica gel,
Fluorination of uranium oxides.

This invention is primarily concerned with a countercurrent system which is generally used for bringing into contact two phases that have not been previously mixed, as in the particular case of countercurrent solvent extraction.

The method of this invention is especially effective in that it permits the establishment of a forced countercurrent contact by causing the heavier phase to move upwardly and the lighter phase downwardly. This occurs especially when the countercurrent system of this invention is applied to distillation, especially under vacuum.

The operation of the countercurrent system of this invention will now be described with reference to the drawings wherein:

FIGURE 1 is a side elevation showing a tubular element of helicoidal form while

Figure 4:
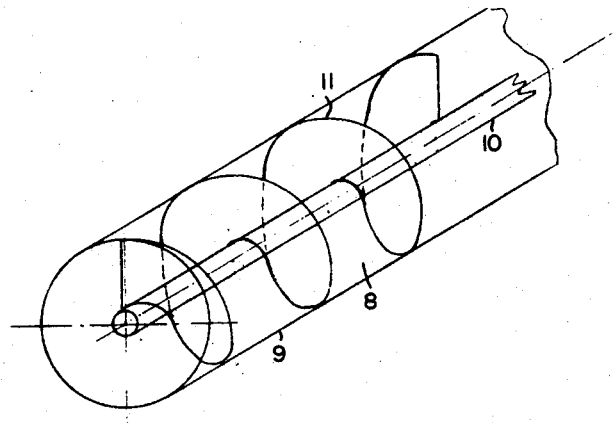

FIGURE 4 is an isometric view of helicoidal space 8 inside a cylinder 9, said space being delimited by the axis 10, the cylinder shell 9 and by helicoidal plate 11 in tight contact with the axis and the cylinder shell.

Figure 5:
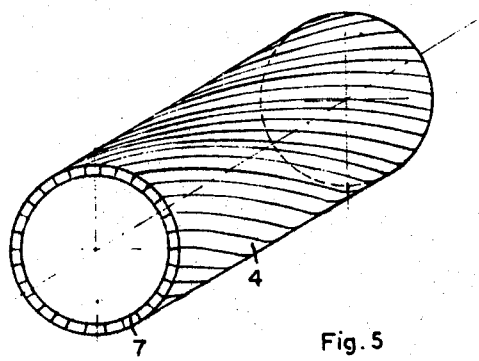

FIGURE 5 is an isometric view of a drum 7 having a plurality of helicoidal compartments such as 4 arranged in parallel on the circular periphery of said drum.

This invention is based on the discovery that when each end of a helicoidal space has a phase introduced into it, at least one of the phases being a fluid, and if the helicoidal space is then turned on its axis, a countercurrent flow of the two phases will then be established inside such space.

As distinguished from classical countercurrent contact based on the action of gravity according to which the heavier phase is introduced at the top and the lighter phase at the bottom, in this invention it is possible to introduce the heavier phase at the bottom of the helicoidal space and the lighter phase at the top of such space. Alternatively, it is also possible to introduce the heavier phase at the top and the lighter phase at the bottom, in which case the displacement caused by rotation of the helicoidal space will be in the same direction as the displacement by gravity so that the two effects will be cumulative.

The direction of the displacement caused by the rotation of the helicoidal space about its axis will depend on the thread of the helical form of this space.

A left-hand thread will be defined as one in which the crests of the convolutions will appear to move upwardly (with a downwardly inclined helix) when the helix is rotated about its axis in a direction that will appear counterclockwise to an observer at the lower end of the helix. Conversely with a helix having left-hand thread, the crests will appear to move downwardly when the helix is given a rotation that appears clockwise to an observer at the lower end of the helix.

A right-hand thread will then be defined as one in which the crests of the helix appear to move downwardly to an observer at the lower end when the helix is rotated counterclockwise.

It has been observed that whatever may be the pitch of the helix, the minor phase, namely that of smaller volume, always moves in the direction of displacement of the crests of the helix while the major phase moves in the opposite direction, and this is always true, regardless of whether the minor phase is the lighter or the heavier of the two.

Figure 1A:
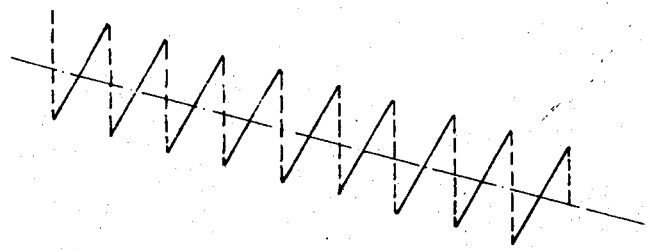
FIGURE 1A shows a diagrammatic representation of this element.
Figure 1:
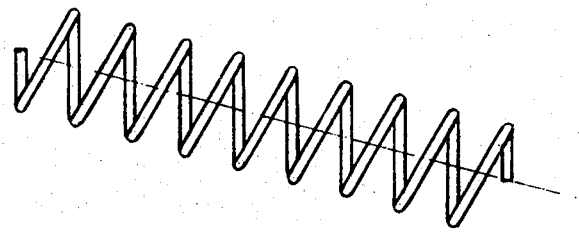
Figure 2:
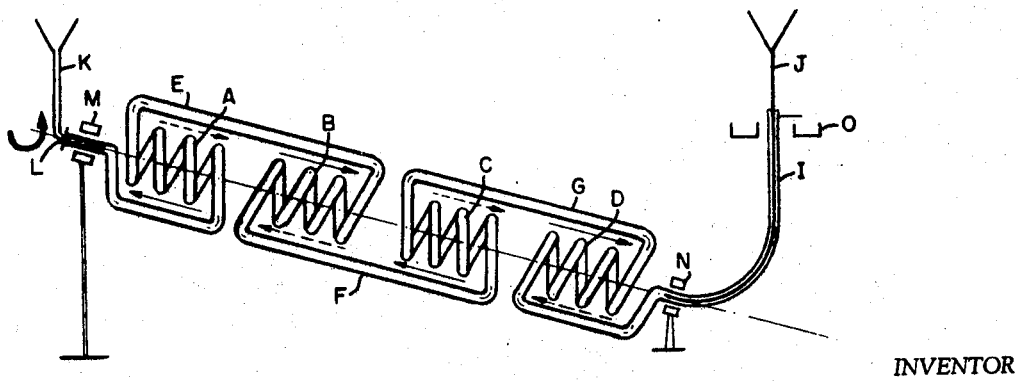
FIGURE 2 is a side elevation showing a tubular element comprising several parts of helicoidal form in which each step is reversed relative to the adjacent steps, such an element being advantageously used for countercurrent extraction.

It is then possible by using a countercurrent contact space formed of a succession of helicoidal elements where each element has a chirality (orientation of thread) opposite to that of the adjacent elements and by connecting the top of each element to the bottom of the next adjacent element by an inclined communicating canal, to cause the phases to be inverted while the two phases pass from one element to the next one, the major phase of one element becoming the minor phase of the next following element. Such a system, as shown in FIGURE 2, designated hereinafter as a "countercurrent system of a plurality of helices with alternate chiralities" can be advantageously used, for example, for countercurrent extraction.

It is, however, also possible to use a helicoidal space that is built up from successive helicoidal elements with the same chirality, but in that case there is no inversion of phases while the material passes from one helicoidal element to the next one.

Whatever may be the system that is adopted, whether it comprises a single helix or a combination of helices with the same or alternate chiralities, it has the following advantages over the classical countercurrent systems:

(1) A very definite diminution of longitudinal diffusion which tends to reduce the countercurrent efficiency. This advantage is especially appreciable in solvent extraction processes.

(2) Elimination of any necessity for regulating the level of the interface between the phases.

In a countercurrent column used, for example, for extraction, it is in fact necessary to regulate the position in the column of the interface between the minor or dispersed phase and the major or continuous phase so as to make it possible to tap off each phase selectively. When, for example, the interface of the dispersed phase is too close to the orifice through which this phase must be withdrawn, there will be danger of removing the dispersed phase entirely and with it some of the major phase. It is then necessary to regulate the level of the interface in such a manner that it remains far enough away from the drainage orifice to avoid any possibility of the two phases being withdrawn through the same orifice.

In this invention, however, such regulation of the level of the interface is not necessary because the rate of discharge from each phase is proportioned automatically to the rate of addition to this phase, as long as this rate of addition remains below the maximum value for the helicoidal space.

If there are several helicoidal elements with alternate chiralities, there will be an interface in each connecting space between adjacent elements because the major phase of one element will constitute the minor phase of the next element, and vice versa. It is then not necessary to regulate the level of this interface because the withdrawal is effected at the exit from one helicoidal element and concerns only one phase since the rate of addition to the other phase is less than the capacity for evacuation of this phase by the helicoidal element.

It is to be understood that the helicoidal elements are not limited to tubular structures. For example, FIGURE 4 shows an equivalent structure which is similar to a screw feeder. Additionally, FIGURE 5 shows a plurality of parallel helicoidal compartments on the periphery of a drum; in an analogous manner the parallel helicoidal compartments may be arranged on the truncated surface of a cone. Other equivalent modifications will also occur to chemical and mechanical engineers.

It is also apparent that the rotational and tangential velocity of the helicoidal space, as well as its inclination to the horizontal and pitch can be varied, if necessary, to produce optimum results for each set of operating conditions. Consequently, this invention is not limited to any particular set of conditions.

For the purpose of exemplification, the helicoidal space may have any inclination between 1° and 90° with respect to the horizontal. However it is preferred to use an inclination in the range of from 5° or 10° to 80° and particularly between 5° and 60°, most preferably between 30° and 60°.

The rotational velocity may be as low as 1 revolution per minute, and according to the treated materials and the pitch of the helicoidal space, it may be as high as 1,000 or even more. By way of example, particularly good results are obtained in solvent extraction by use of rotational velocities of the order of 5–100 r.p.m.

The minimum pitch of the threads is any axis angle above the horizontal; whereas the maximum pitch is that which would bring any portion of the helicoidal structure to a horizontal position.

As examples of the use of the countercurrent system of this invention, its application to distillation and to solvent extraction will be examined, but the invention is obviously not limited to these two examples.

DISTILLATION

The ability with this invention to impart movement of the minor phase in one direction makes it possible to perform distillation with condensation at different pressures inside the liquid to be fractionated.

For this purpose it is sufficient to connect the boiler 1 (FIGURE 3) which is provided with heating means 2 to the upper part 3 of an inclined helicoidal space containing the liquid to be distilled.

The gaseous phase obtained by vaporization in the boiler is entrained in a descending direction by the convolutions 4 of the helix (which has in FIGURE 3 a right-hand thread and is rotated in a direction that would appear counterclockwise to an observer at the lower end of the helix), in countercurrent relation to the liquid to be distilled which can be introduced at a suitable level 5, into the helicoidal space. The bottom residue is withdrawn from the boiler by the axial tube 6. The helicoidal space therefore functions as a fractionating column in which the pressure is greater than in the boiler. In fact, the pressure at the level of the boiler is less than at the lower end of the helicoidal space, the difference in pressures at these two levels being dependent on their difference in height.

It is therefore apparent that the countercurrent system of this invention is particularly well adapted for distillation under vacuum. In fact, this can be readily accomplished by keeping the lower end of the helix under atmospheric pressure, the pressure in the boiler then being less than atmospheric. The pressure in the boiler can be adjusted to the desired value by choosing in a suitable manner the height of the boiler relative to that of the lower end of the helicoidal space, the latter being eventually connected to a condenser. However, the difference in pressure due to the difference in level between the boiler and the lower end of the helicoidal space is also influenced by the operating conditions, and especially by the rate of movement of the vapors that flow through the helicoidal space, this flow being capable of regulation by controlling the heat supplied to the boiler.

The pressure in the boiler is also affected by the rate of rotation of the helicoidal space around its axis. In fact, for the same temperature, the greater the speed of rotation of the helicoidal space (within the limits of operating speeds) the lower will be the pressure in the boiler. With a constant flow of gas through the helicoidal space, the higher the speed of rotation, the less will be the proportion of gas in the helicoidal space at each instant and hence the greater will be the difference in pressures.

The classical techniques of fractional distillation are applicable to distillation under varying pressures under this invention when the major phase is liquid. However, when the major phase is gaseous, the difference in pressure between the boiler and the opposite end of the helicoidal space can be very small.

In the latter case the boiler can then be placed at the lower end of the helicoidal space. Such a system is analogous to the classical system of the column called "wet wall" where the liquid flows down the walls of the column while the effluent gas passes up the central part. Such columns have the advantage of permitting effective fractionation with only a small pressure drop. However, their regulation is delicate because it is very difficult to maintain a constant film of liquid on the walls. In contrast, the helical form of this invention is especially well adapted to maintain such a liquid film.

Although the use of this invention for countercurrent distillation is interesting, especially in the case of vacuum distillation, its use for solvent extraction appears even more advantageous than the classical countercurrent extraction systems.

SOLVENT EXTRACTION

For this application it is preferable to use a system formed of several helicoidal elements such as A, B, C, D connected in series by connecting by means of an inclined conduit such as E, F, G the top of each element with the bottom of the next lower element of opposite chirality (see FIGURE 2).

As has already been explained above, in such a system there will be an inversion of phases from one helicoidal element to the next.

The movement of the phases in countercurrent relation in the helicoidal elements is assured by the rotation of these elements (arrow H). However, to ensure the passage of the phases from one element to the next one through the connecting conduit provided for this purpose, it is necessary to make use of the force of gravity. The assembly will then be fed from the top by means of the heavier phase and from the bottom by means of the lighter phase.

The feeding by means of two fluids of the system in rotation can be effected for example by arranging the discharge tube and the inlet tube concentrically on the axis of rotation of the helicoidal elements. However, at the lower end of the system the discharge tube I and the tube for introducing the lighter phase J positioned coaxially inside thereof can advantageously be curved upwardly to maintain the discharge level of the heavy phase as shown in FIGURE 2, so as to maintain a hydraulic equilibrium. The introduction of each phase can be assured, for example, by using volumetric pumps. The light phase is discharged through L, M and N are bearing surfaces. O is the evacuation channel for the heavy phase.

If in FIGURE 2 the entire system rotates clockwise as viewed from the lower end, and the heavy phase is fed into the upper end through K while the light phase is fed into the lower end, then the solid arrows show the direction of movement of the major phase in each helicoidal element while the dotted arrows indicate the movement of the minor phase in the opposite direction. The arrows above the axis of rotation show the direction of the lighter phase while those below the axis show the direction of the heavier phase.

Proceeding from the top down, the successive helicoidal elements have the following threads:

Element:
```
1st ------------------------------ Left-hand.
2nd ------------------------------ Right-hand.
3rd ------------------------------ Left-hand.
4th ------------------------------ Right-hand.
```

Such a system has been tested, e.g. for countercurrent extraction by the use of tubular helicoidal elements of 20 mm. diameter wound upon a drum 15 cm. in diameter and inclined 30° to the horizontal. The apparatus was fed with water at the top and with normal heptane at the bottom, the two phases containing benzoic acid in different proportions. The results of the experiments are given in the following examples.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever. In these examples, the concentrations are given in percent by weight.

Example 1

This example relates to the extraction by water of benzoic acid contained in heptane.

In the apparatus just described, 7.5 liters per hour of water containing 0.37% benzoic acid are introduced at the top while 2.5 liters per hour of heptane containing 6.6% benzoic acid are introduced at the bottom. The helicoidal structure was rotated about its axis at the rate of 12 revolutions per minute in clockwise direction as viewed from the lower end.

Heptane containing 0.23% benzoic acid was then collected at the top while the water that was collected at the bottom had its benzoic acid concentration increased to 2.20%.

These results show the great efficiency of the apparatus of this invention for countercurrent solvent extraction which is equivalent to 6 theoretical stages, the number of theoretical stages having been determined by the equilibrium curve established experimentally by the well known graphical method described, e.g., in "Chemical Engineering Handbook," J. H. Perry, 3rd edition, pages 733, McGraw-Hill Book Company Inc.

Example 2

This example relates to the inverse process of extracting benzoic acid by heptane from an aqueous solution of the acid.

The apparatus is fed at the top with 7.5 liters per hour of water containing 2.02% benzoic acid and at the bottom with 2.5 liters per hour of heptane containing 0.156% benzoic acid.

The helicoidal structure is then rotated in the same direction and at the same speed as before (12 revolutions per minute). From the upper discharge orifice heptane containing 3.1% benzoic acid is collected while the water which was collected from the lower orifice did not have more than 0.89% benzoic acid. The extraction therefore reached the highly efficient level of 7 theoretical stages.

The experimental values given hereinabove are those which have been obtained by laboratory procedures and have not been corrected to take into account the margin of measuring error.

Example 3

Figure 3:
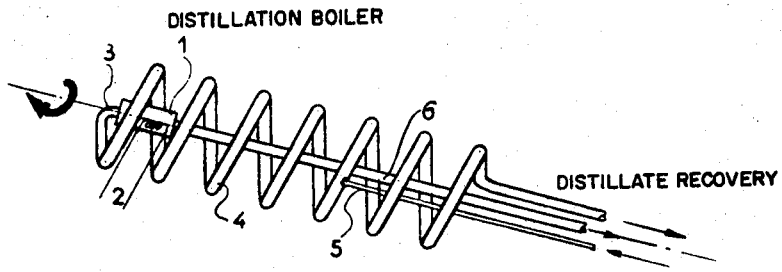
FIGURE 3 is a side elevation schematically showing the application of the countercurrent contact system of this invention to distillation.

This example relates to the distillation under slight vacuum of an aqueous methanol solution. In the apparatus hereabove described further comprising a boiler at the upper end of the helix and an inlet pipe at mid-way thereof, as illustrated by FIGURE 3, there are introduced through said inlet pipe a flow of 15 liters per hour of the methanol aqueous solution at a concentration of 35% by weight. The apparatus was rotated about its axis at a rate of 15 r.p.m. The pressure at the boiler was of 600 mm. Hg. The residue withdrawn from the boiler had a methanol concentration reduced to 14% by weight.

In a batch system the system has also been tested, using vinyl tubing having a diameter of 20 mm. wound on a 15 cm. axis with 10 cm. pitch and having an axis length of 5 meters. A copper boiler was heated at the upper end by means of a radiant heater. The unit operated at 10 r.p.m. and an axis inclination of 45°. It was filled with 35 percent aqueous methanol, and after 75 minutes the pressure in the boiler was 660 mm. Hg, the pressure at the bottom was 820 mm., and the liquid composition in the boiler was 14 percent aqueous methanol.

In addition to performing mass transfer between two unmixed phases, this invention also covers the separation of the component phases of a mixture when they are intimately bound together in the starting material, as in emulsions (intimate mixtures of two liquid phases) and suspensions (intimate mixtures of a liquid phase and a solid phase).

As examples of emulsions and suspensions which can be treated for the separation of their constituents by the countercurrent method of this invention mention should be made especially of the following:

Emulsions of oil in water or water in oil. Such emulsions can be produced, e.g., during refining operations such as the washing of organic products by basic alkaline solutions and the desulfurizing of light naphthas by washing with aqueous solvents for mercaptans. They are also encountered in drill holes because of the frequent presence of salt water in the strata, and because of the use of aqueous drilling muds during drilling operations. Emulsions of water in fuel oils and in crude petroleum are often produced both in the storage reservoirs for these hydrocarbons and in oil tankers.

Among the suspensions which can be treated by the method of the invention can be mentioned for example the liquids that are used for the treatment of minerals by leaching, such as the acid liquids used for washing metals (uranium, gold, nickel, copper, etc.).

The following example is directed to a separation process performed in an apparatus comprising a single helix inclined by 30° with respect to the horizontal and provided with an inlet at mid-way of the helix.

Example 4

In the above described apparatus are introduced at the mid-way inlet 10 liters per hour of a water in oil emulsion having a 10% by volume water content. At the top of the helix are introduced simultaneously 10 liters per hour of water. The apparatus is rotated about its axis at a rate of 15 r.p.m.

At the bottom of the helix are withdrawn per hour 10.9 liters of substantially pure water and at the top of the helix 9.1 liters per hour of substantially pure oil.

It is to be noted that a wide variety of devices can be employed to mount the helicoidal tube so that it can be rotated about its longitudinal axis which is inclined to the horizontal. As means for mounting the tube for rotation, a bearing of any type, preferably a ball bearing will be satisfactory. As drive means, conventional elements just as pulleys, belts, gears, shafts and motors may be used in almost endless combinations, as will be obvious to any mechanic.

From the foregoing description, one skilled in the art can easily ascertain the essential characteristics of this invention, and without departing from the spirit and scope thereof, can make various changes and modifications of the invention to adapt it to various usages and conditions. For example, the connection between two adjacent elements can be made in different ways, for example, by connecting the top of the upper element to the top of the lower element, or the bottom of the upper element to the bottom of the lower element, or the bottom of the upper element to the top of the lower element, the adjacent helicoidal elements being of either the same or of opposite threads. Consequently, such changes and modifications are properly, equitably, and intended to be, within the full range of equivalence of the following claims.

What is claimed is:

1. A countercurrent contact process between two phases of which at least one is a liquid and the other is selected from the group consisting of solid and liquid, which process comprises passing said two phases in countercurrent contact through a continuous helicoidal zone having its longitudinal axis inclined to the horizontal and with passage from one helicoidal turn to the next being possible only through the helicoidal path, and rotating the helicoidal zone about said longitudinal axis.

2. The process of claim 1, wherein the longitudinal axis of the helicoidal zone is inclined by 5° to 80° with respect to horizontal.

3. The process of claim 1, wherein the rotational velocity is about 5 to 100 rotations per minute.

4. The process of claim 1 wherein the two phases are introduced at opposite ends of the helicoidal zone.

5. The process of claim 2 wherein the two phases are liquids, one of said liquids being a mixture of at least two components, and the other of said liquids being a preferential solvent for one of said components, whereby there is effected a system of countercurrent solvent extraction.

6. Apparatus for effecting countercurrent contact which apparatus comprises means for enclosing a righthand thread helicoidal passage having an inlet and outlet and means for enclosing a left-hand thread helicoidal passage having an inlet and an outlet, both of said means being tightly connected in series to one another by one of said inlets and one of said outlets and means for mounting both of said means for rotation about a common longitudinal axis inclined by 5 to 80° with respect to the horizontal.

7. A method for separating a dispersion into its component parts, which method comprises passing a dispersion into a continuous tight helicoidal zone having its longitudinal axis inclined 5° to 60° with respect to the horizontal, and rotating the helicoidal zone about said longitudinal axis to break the dispersion into two component phases, and collecting said component phases at opposite ends of said helicoidal zone.

References Cited

UNITED STATES PATENTS

| Re. 25,186 | 6/1962 | Raymond | 23—269 X |
| 1,084,980 | 1/1914 | Trump | 23—270 |
| 2,012,924 | 8/1935 | Berge | 23—269 X |
| 2,036,924 | 4/1936 | Coutour | 23—269 X |
| 2,385,074 | 9/1936 | Guignard | 202—238 |
| 2,838,178 | 6/1958 | Bankes | 252—360 |
| 3,164,444 | 1/1965 | Anderson | 23—270.5 |

FOREIGN PATENTS 499,433  6/1930  Germany.

NORMAN YUDKOFF, *Primary Examiner.*